(12) United States Patent
Mills

(10) Patent No.: US 6,564,911 B2
(45) Date of Patent: May 20, 2003

(54) BRAKING ASSEMBLY

(75) Inventor: Robert A. R. Mills, Calgary (CA)

(73) Assignee: Kudu Industries Inc., Calgary (CA)

( * ) Notice: Subject to any disclaimer, the term of this patent is extended or adjusted under 35 U.S.C. 154(b) by 0 days.

(21) Appl. No.: 10/044,857

(22) Filed: Jan. 11, 2002

(65) Prior Publication Data

US 2002/0185344 A1 Dec. 12, 2002

(30) Foreign Application Priority Data

Jun. 12, 2001 (CA) .......................................... 2350298

(51) Int. Cl.$^7$ .............................................. F16D 63/00
(52) U.S. Cl. ........................................ 188/82.8; 188/67
(58) Field of Search ........................ 188/67, 82.8, 82.9, 188/170; 192/8 R

(56) References Cited

U.S. PATENT DOCUMENTS

| | | |
|---|---|---|
| 3,536,169 A | 10/1970 | Arnold |
| 3,994,376 A * | 11/1976 | Fulghum ..................... 192/8 R |
| 4,216,848 A | 8/1980 | Shimodaira |
| 4,797,075 A | 1/1989 | Edwards et al. |
| 4,993,276 A | 2/1991 | Edwards |
| 5,358,036 A | 10/1994 | Mills |
| 5,749,146 A | 5/1998 | Belcher |
| 6,273,221 B1 * | 8/2001 | Schmidt ..................... 188/170 |
| 6,405,837 B1 * | 6/2002 | Muramoto ................. 188/72.5 |

* cited by examiner

Primary Examiner—Christopher P. Schwartz
(74) Attorney, Agent, or Firm—Drinker Biddle & Reath LLP

(57) ABSTRACT

The invention relates to a braking assembly for permitting axial rotation of a shaft in a first direction and inhibiting axial rotation of the shaft in a second, opposite direction, comprising: a hydraulic clutch having a torque generating member and a torque receiving member wherein the torque generating member is connected to the shaft and the torque receiving member is stationary and a guide means for maintaining the torque generating member in a first de-activated position when the shaft is rotated in the first direction and for moving the torque generating member to a second activated position when the shaft is rotated in the opposite direction whereby activation of the torque generating member inhibits rotation of the shaft in the second direction.

The invention provides an effective emergency braking assembly for such systems as progressing cavity pumps in oil wells.

3 Claims, 3 Drawing Sheets

BRAKING ASSEMBLY

FIELD OF THE INVENTION

The present invention relates to safety brake assemblies and, in particular, to safety brake assemblies which permit rotation of a shaft in one direction and inhibit rotation of the shaft in the other opposite direction.

BACKGROUND OF THE INVENTION

Certain drive systems are subject to torsional stresses which are stored as reactive torque in a drive train. When drive power to the system is interrupted, the reactive torque is released as back-spin and, if an uncontrolled release of torque occurs, personal injury and/or property damage can result. For example, deep well submersible pumps such as progressing cavity pumps driven by sucker rod strings are commonly used to pump oil from deep wells. The drive string for these submersible pumps usually have a relatively small diameter of ¾ to 1⅛ inches. Such drive strings are commonly used in wells that vary from 1,500' to 6,000' in depth, 3,000' being a common average. Progressing cavity pumps include a stator which is attached to a production tubing at the bottom of a well and a rotor which is attached to a bottom end of the drive string. Progressing cavity pumps are frequently used to pump viscous crude oil which is often laden with sand or other impurities. As a result, the elongated drive string is subject to considerable torsional force. This torsional force is stored in the elongated drive string as a reactive torque. In a 3,000 foot string, as many as several hundreds of revolutions of torsion can be stored in the string if viscous sand laden crude oil is being pumped. When power is interrupted to the drive string, the reactive torque is released. Unless the release of reactive torque is controlled, costly and undesirable damage to equipment and/or personal injury to workmen in the vicinity can result. This is particularly true if an electric motor is used as a power source because such motors offer almost no resistance to reverse rotation.

Using a progressing cavity pump as an example, if drive power is interrupted to the drive string the reactive torque is desirably released in a controlled fashion. A progressing cavity pump may operate at speeds such as from one hundred to five hundred revolutions per minute. Brakes which simply prevent the release of the reactive torque in the drive string are unsatisfactory for two reasons. First, it is preferable that in the case of an electric motor drive, the motor restart unattended when power is restored. In order to ensure a successful unattended restart, the motor must start without load. If the reactive torque in the drive string is not released prior to restart, the motor may not be capable of restarting and the motor may be damaged as a result. Second, if pump repair or replacement is required any unreleased torque in the drive string can be extremely dangerous for unaware workmen. Severe personal injury can result from the unintentional release of reactive torque in such drive strings.

Consequently, braking systems have been invented to controllably release the back-spin due to reactive torque in elongated drive strings. One system is a fluid brake that includes a pump engaged only when reactive torque is released from the drive string. The pump is used to circulate hydraulic fluid or lubricating oil from a reservoir to a bearing case through a restricted orifice. The resistance of the fluid created by the restriction serves to control the release of reactive torque. Nonetheless, this apparatus is subject to the disadvantage that it must be engaged by an over-riding clutch mechanism when back-spin is initiated.

U.S. Pat. No. 5,749,416 describes an over-running or overriding hydraulic clutch to provide braking on the drive string of a downhole pump when power is interrupted. A free-wheel permits the drive shaft to rotate in the desired direction when the pump is running. When power is interrupted, the clutch engages and inhibits the reactive torque in the drive string from rotating the drive string backwards out of control. The problems with an overriding clutch are that overriding clutches are meant to run mainly in an engaged position. They disengage reliably but they do not necessarily engage reliably. Also, an overriding clutch wears when running disengaged. In the case of a progressing cavity pump, the over-riding clutch may be running almost exclusively in a disengaged position. The wear would then be considerable. This means that it could not then be relied upon to engage properly.

Other brake systems for controlling reactive torques have been invented. Those brake systems are based on centrifugal braking principles. Examples of such braking systems are found in U.S. Pat. No. 4,216,848 which issued to Toyohisa Shiomdaira on Aug. 12, 1980; U.S. Pat. No. 4,797,075 which issued to Wallace L. Edwards et al on Jan. 10, 1989 and U.S. Pat. No. 4,993,276 which issued to Wallace L. Edwards on Feb. 19, 1991. The brakes disclosed in these patents all include brake shoes which are mounted within a housing and are therefore difficult to access and maintain. Such brakes require frequent maintenance when they are used to stop the reverse rotation of drive strings in a controlled manner. In addition, they are mechanically complicated and include custom-made moving parts which are costly to manufacture and expensive to keep in inventory.

SUMMARY OF THE INVENTION

It is an object of the invention to provide a relatively simple, reliable brake system which is easy to maintain for permitting axial rotation of a shaft in one direction while inhibiting axial rotation of the shaft in the opposite direction.

According to the present invention there is provided a braking assembly for permitting axial rotation of a shaft in a first direction and inhibiting axial rotation of the shaft in a second, opposite direction, comprising: a hydrostatic clutch having a torque generating member and a torque receiving member wherein the torque generating member is connected to the shaft and the torque receiving member is stationary, and a guide means for maintaining the torque generating member in a first de-activated position when the shaft is rotated in the first direction and for moving the torque generating member to a second activated position when the shaft is rotated in the opposite direction whereby activation of the torque generating member inhibits rotation of the shaft in the second direction.

The design of hydrostatic brake components such as the torque generating member and the torque receiving member is known to those skilled in the art. These two components would normally be turbines which include a plurality of vanes circumferentially arranged around the axis of the drive shaft to which the torque generating member is operatively connected. The vanes are angled to provide fluid coupling in one rotational direction about the drive shaft axis.

In this description and in the drawings the invention will be illustrated by its use in progressing cavity pumps. However, it is to be understood that the invention may be used in any system having a drive shaft which needs a braking system for a rotational direction opposite to a working rotational direction.

The guide means may be any suitable means to separate the torque generating member from the torque receiving member when the shaft is rotating in a working direction and which bring the torque generating member and the torque receiving member into fluid coupling connection in an opposite direction.

BRIEF DESCRIPTION OF THE DRAWINGS

The invention will be further described with reference to the accompanying drawings in which.

DETAILED DESCRIPTION OF THE INVENTION

Figure 1:
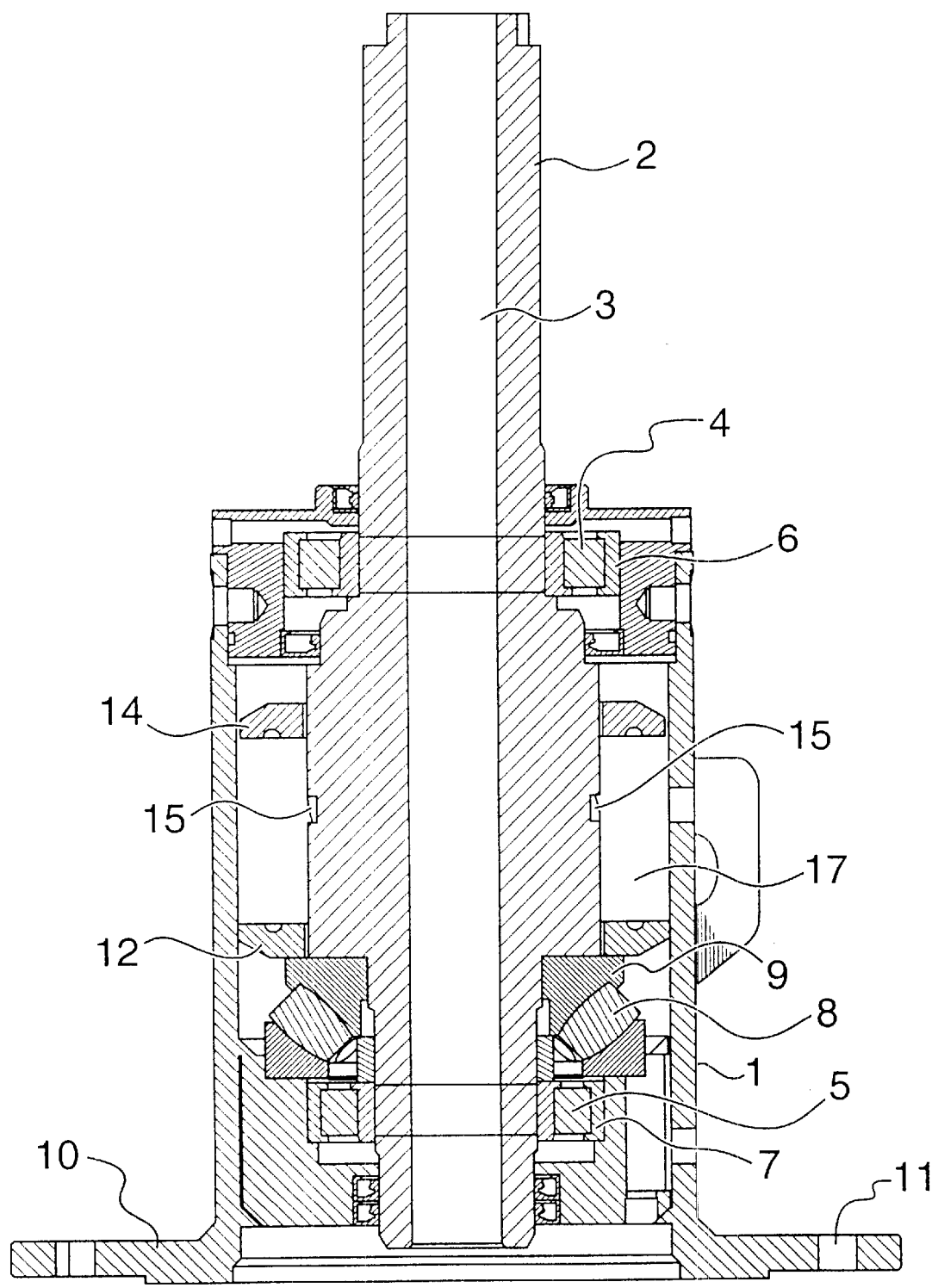
FIG. 1 is a cross-section of part of a progressing cavity pump drive-head assembly including a braking assembly according to the invention.

Referring to FIG. 1, a main housing 1 houses part of a drive shaft 2 having a hollow center 3 to accommodate a polished rod (not shown) at the top rod of a drive string to remotely operate a progressing cavity pump (not shown). The drive shaft 2 may be driven by a standard electric motor (not shown) for driving drive strings of progressing cavity pumps. The drive shaft is rotatably mounted by means of bearings 4 and 5 in bearing housings 6 and 7 to stabilize verticality of the drive shaft 2 and thrust bearings 8 in housing 9 to support the weight of the drive shaft 2 and drill string. Flange 10 and slot 11 provide means to mount the housing 1 to the yoke or "frame" at the drive-head. Around the body of drive shaft 2 are turbine members 12 and 14. Turbine member 12 is fixed in relation to main housing 1 and is the stationary turbine or torque receiving member. Turbine member 14 is operatively connected to drive shaft 2 and rotates therewith. Turbine member 14 is therefore the rotating turbine or torque generating member.

The torque generating member 14 is movable from a deactivated position (as shown in FIG. 1) to an activated position. In the de-activated position the torque generating member 14 is separated from the torque receiving member 12 so that there is no fluid connection between the two members and substantially no braking effect. Movement of the torque generating member 14 between the activated and de-activated positions is effected by a guide means which preferably comprises a pair of helical grooves or channels 15 around the circumference of drive shaft 2 and a pair of corresponding projections (shown in FIG. 4) which slot into channels 15 and which, by following the course of the channels, move the torque generating member up the drive shaft 2 and away from torque receiving member 12 or down the drive shaft 2 and into fluid coupling engagement with torque receiving member 12. The channels 15 are arranged to ensure that rotation of the shaft in a first direction, or a working direction, moves the torque generating member 14 up and away from torque receiving member 12 to the de-activated position, and that rotation of the drive shaft 2 in an opposite direction moves the torque generating member 14 down the shaft 2 to the activated position in which the fluid coupling has a braking effect on the torque generating member and thus on the drive shaft 2. It will be seen that any means which separates torque generating member 14 from torque receiving member 12 and brings them into fluid coupling in response to the rotational direction of the drive shaft is suitable as the guide means. However, the helical channel and projection arrangement is preferred.

Figure 2:
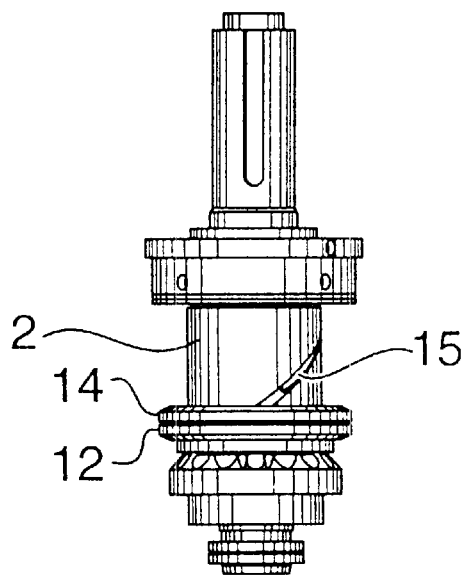
FIGS. 2 and 3 show a side view of a drive shaft and braking assembly according to the invention in activated and de-activated positions respectively.
Figure 3:
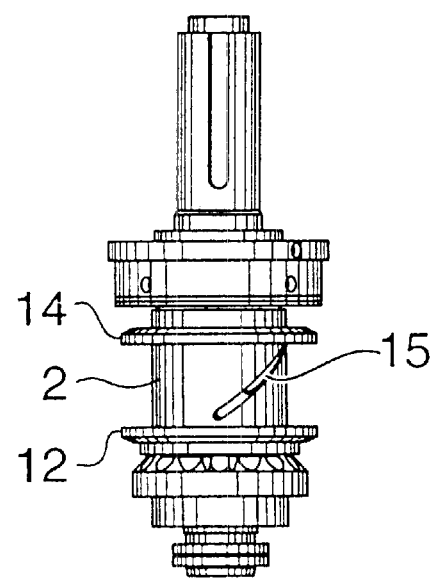

FIGS. 2 and 3 show that the torque generating member 14 in the activated and de-activated positions respectively.

Chamber 17 provides a reservoir the fluid coupling between the torque generating member and the torque receiving member. Channel 15 is shaped so that in operation, when drive shaft 2 rotates in a first direction the motion of the shaft exerts a force on the torque generating member 14 which causes projection 16 to progress along channel 15 in such a way as to move the torque generating member 12 into a de-activated position. When the drive shaft 2 rotates in the opposite direction, the reversal of the force causes torque generating member 14 to travel down the shaft 2 towards torque receiving member 12 and into the activated position which exerts a braking effect on the rotation of drive shaft 2.

In an alternative embodiment the torque receiving member 12 could be above and the torque generating member 14 below so that motion of the torque generating member 14 would be reversed, travelling downward to a de-activated position and upwards to an activated position.

Thus the braking assembly according to the present invention provides braking to the shaft by way of the hydrostatic brake. When the torque generating member is brought into the activated position, the hydraulic coupling with the torque receiving member, which is fixed, inhibits rotation of the shaft. The guide means ensures that when the shaft is rotating in the first direction, the two components of the hydrostatic brake, the torque generating member and the torque receiving member, are separated in the first de-activated position so that there is effectively no fluid coupling between them. In this de-activated position it is as if the brake does not exist and the shaft may freely rotate in the first direction.

However, when the shaft rotates in a second direction, the opposite direction to the first direction, the guide means brings the two components of the hydraulic clutch into the activated position in which fluid coupling exists between the two components. The torque receiving member, which is fixed, then inhibits rotation of torque generating member which in turn inhibits rotation of the shaft thus achieving a braking effect.

It will be seen that therefore that the present assembly reduces or avoids problems associated with an overrunning or overriding clutch. That is, in the present invention, while the shaft is rotating in the first direction, since there is physical separation of the two brake components, the torque generating member and the torque receiving member, wear of the components in this direction is minimized. Further the separation minimizes any drag on the rotation of the shaft caused by the simultaneous rotation of the torque generating member.

Figure 4:
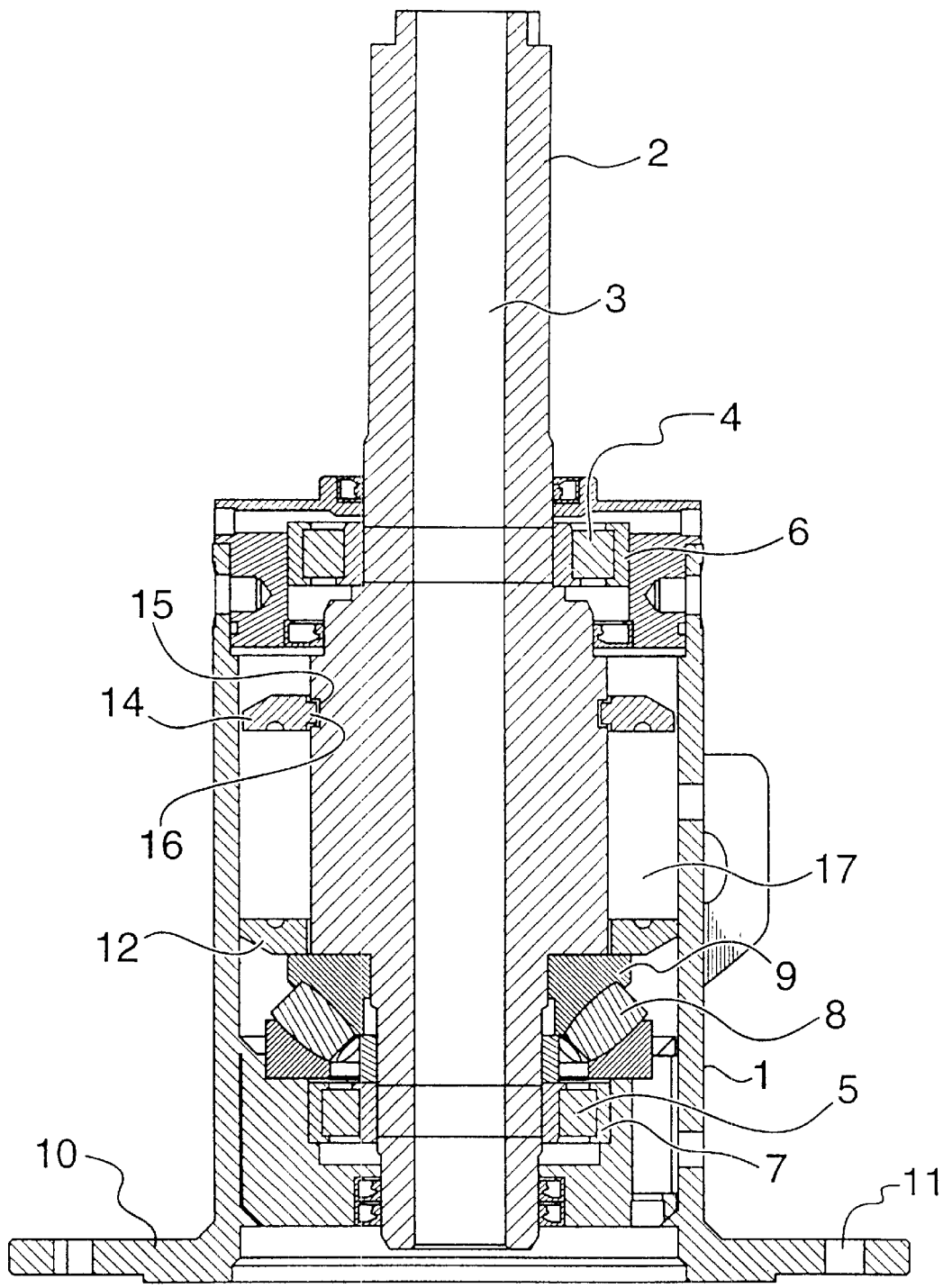
FIG. 4 is the same as FIG. 1 except that the cross-section is at a different orientation.

FIG. 4 is the same as FIG. 1 except that the cross-section is taken at a different angle to shown projection 16, which is integral with torque generating member 14, located in channel 15.

From the above discussion, it will be readily apparent to a person of ordinary skill that various changes and modifications can be made without departing from the spirit of the invention. All of such changes and modifications are contemplated as being within the scope of the present invention.

We claim:

1. A braking assembly for permitting axial rotation of a shaft in a first direction and inhibiting axial rotation of the shaft in a second, opposite direction, comprising:

a hydrostatic brake having a torque generating member and a torque receiving member wherein the torque generating member is connected to the shaft and the torque receiving member is stationary; and a guide means for maintaining the torque generating member in a first de-activated position when the shaft is rotated in the first direction and for moving the torque generating member to a second activated position when the shaft is rotated in the opposite direction whereby activation of the torque generating member inhibits rotation of the shaft in the second direction.

2. An assembly according to claim 1 wherein the guide means comprises at least one helical groove in the shaft and at least one corresponding projection on the torque generating member each said at least one projection adapted to cooperate with each said at least one groove, each groove and projection arranged so that rotation in the first direction maintains the torque generating member in the first de-activated position and rotation in the second direction moves the torque generating member to the second activated position.

3. An assembly according to claim 2 wherein the guide means comprises two said helical grooves and two said correspond projections cooperating with the corresponding grooves.

* * * * *